(12) United States Patent
Braun

(10) Patent No.: US 7,480,331 B2
(45) Date of Patent: Jan. 20, 2009

(54) METHOD AND DEVICE FOR PULSE WIDTH MODULATION

(75) Inventor: Christoph Braun, Munich (DE)

(73) Assignee: Infineon Technologies AG, Munich (DE)

( * ) Notice: Subject to any disclaimer, the term of this patent is extended or adjusted under 35 U.S.C. 154(b) by 785 days.

(21) Appl. No.: 10/976,074

(22) Filed: Oct. 28, 2004

(65) Prior Publication Data
US 2005/0146388 A1 Jul. 7, 2005

(30) Foreign Application Priority Data
Oct. 29, 2003 (DE) .................. 103 50 336

(51) Int. Cl.
*H03K 7/08* (2006.01)
*H03K 7/04* (2006.01)
(52) U.S. Cl. ........................ 375/238; 375/239
(58) Field of Classification Search ............... 375/238, 375/239, 242, 243, 253, 254; 332/109, 112
See application file for complete search history.

(56) References Cited

U.S. PATENT DOCUMENTS

| | | | |
|---|---|---|---|
| 4,825,452 A | 4/1989 | Wong | |
| 5,548,286 A * | 8/1996 | Craven | 332/109 |
| 5,994,973 A * | 11/1999 | Toki | 332/109 |
| 6,300,892 B2 | 10/2001 | Braun | |
| 6,671,329 B1 | 12/2003 | Lenz | |
| 2003/0095013 A1 | 5/2003 | Melanson et al. | |
| 2004/0165661 A1 | 8/2004 | Braun | |

* cited by examiner

*Primary Examiner*—Betsy L Deppe
(74) *Attorney, Agent, or Firm*—Dicke, Billig & Czaja, PLLC

(57) ABSTRACT

A method and a device are proposed for the conversion of a quantized signal into a pulse width modulated signal, wherein dependent on a signal value of the quantized signal in each case a pulse duration of a pulse is determined within a period of the pulse width modulated signal, in which the pulse width modulated signal assumes a first value, while in the remainder of the period it assumes a second value, and wherein a phase position of the pulse is varied within the period of the pulse modulated signal from period to period in such a manner that energy of the pulse width modulated signal is distributed across a broad frequency spectrum. In one case, this takes place by means of parallel switched SD modulators and a vector controller.

26 Claims, 5 Drawing Sheets

FIG 5
| k | n | y1 | y2 | y3 | y4 | y5 | y6 | y7 | s1 | s2 | s3 | s4 | s5 | s6 | s7 |
|---|---|----|----|----|----|----|----|----|----|----|----|----|----|----|----|
| 1 | 1 | 0 | -1 | 5 | 2 | 1 | 0 | 3 | -1 | -1 | +1 | -1 | -1 | -1 | -1 |
| 2 | 1 | 1 | 4 | 2 | 1 | 4 | 2 | 1 | -1 | +1 | -1 | -1 | -1 | -1 | -1 |
| 3 | 3 | -6 | 0 | 5 | 4 | 1 | 2 | -3 | -1 | -1 | +1 | +1 | +1 | -1 | -1 |
| 4 | 5 | 3 | 2 | 3 | 3 | 2 | -1 | 3 | +1 | +1 | +1 | +1 | -1 | -1 | +1 |
| 5 | 4 | 1 | -2 | 3 | -5 | 3 | 5 | 3 | +1 | -1 | -1 | -1 | +1 | +1 | +1 |
FIG 6
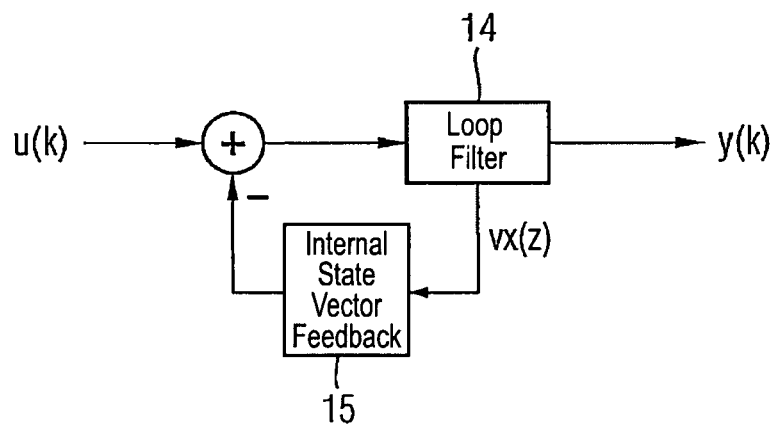
FIG 7
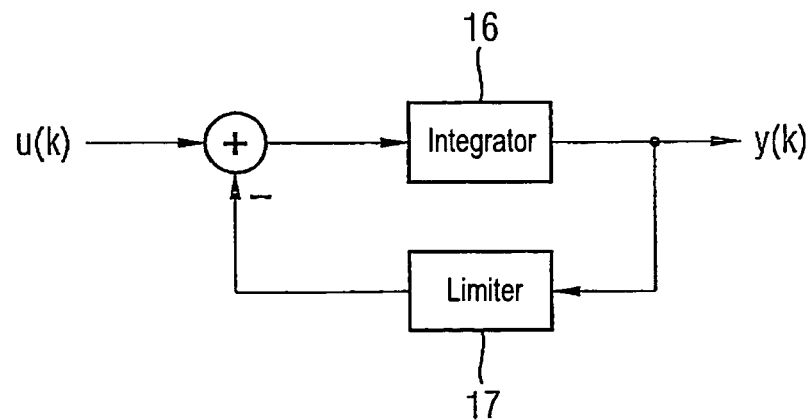

(PRIOR ART)

METHOD AND DEVICE FOR PULSE WIDTH MODULATION

CROSS-REFERENCE TO RELATED APPLICATIONS

This Utility Patent Application claims priority to German Patent Application No. DE 103 50 336.6, filed on Oct. 29, 2003, which is incorporated herein by reference.

BACKGROUND

The present invention relates to a method and a device for pulse width modulation. In particular it relates to a method and a device for converting a quantized signal into a pulse width modulated signal.

So-called Class D amplifiers are gaining more and more importance particularly in entertainment electronics, since with suitable design they have a high degree of efficiency and can be realized predominantly in digital circuit technology. In this case a pulse width modulated square wave signal (PWM signal) with constant pulse frequency and/or carrier frequency is used for controlling an amplifier stage, whereby a pulse duration of a pulse of the pulse duration modulated square wave signal within a period of the PWM signal corresponds to a signal "amplitude".

A conventional device for generating these PWM signals is schematically illustrated in FIG. 11. In this case an input signal d, for example a pulse code modulated (PCM) signal, is fed to a quantizer 28. The signal quantized in this way is fed to a so-called PWM mapper 29, which allocates the corresponding pulse lengths to the different amplitude values of the signal emitted by the quantizer 28. Conventionally each pulse starts at the beginning of a period of the PWM signal.

Due to the use of square wave pulses the degree of efficiency of an end stage, to which the pulse width modulated signal f from FIG. 11 is fed, in principle may amount to over 90%.

However this is only the case if harmonics of the pulse width modulated signal can be adequately attenuated without loss. With the conventional method of pulse width modulation the main amplitude components are generally arranged in the spectral region at multiples of the carrier frequency of the pulse width modulated signal, which makes post-filtering difficult. This post-filtering is necessary, since normally specific spectral masks and/or spectral ranges must be maintained for the PWM signal.

Additionally, amplitude values at multiples of the carrier frequency produce major interference in a current supply to the end stage of the amplifier, since essentially voltage drops occur in the carrier frequency cycle. This strong correlation between carrier frequency and interference voltage can lead to substantial problems in the case of multiple use of the current supply, since cross modulation of the carrier frequency can hardly be avoided.

SUMMARY

One embodiment of the invention provides a method and a device for the conversion of a quantized signal into a pulse width modulated signal, as a result of which post-filtering of the pulse width modulated signal is facilitated and interference in a current supply is prevented or reduced.

For the conversion of the quantized signal into the pulse width modulated signal, one embodiment of the invention proposes that dependent on a signal value of the quantized signal in each case a pulse duration of a pulse is determined within a period of the pulse width modulated signal, in which the pulse width modulated signal assumes a first value, while it assumes a second value in the remainder of the period. A phase position of the pulse is varied within the period of the pulse modulated signal from period to period, so as to distribute an energy of the pulse width modulated signal over the frequency spectrum of the pulse width modulated signal.

As a result of the variation of the phase position of the pulse, it is possible to prevent the energy of the pulse width modulated signal being heavily concentrated on multiples of a carrier frequency of the pulse width modulated signal. Post-filtering of the signal is thus simplified and interference in a voltage supply is prevented or at least reduced. In this case it is to be noted that the phase of the pulse can also be set in such a manner that a first part of the pulse appears at the end of the period and a second part of the pulse appears at the beginning of the period. The period observed in each case is regarded as though it were circular.

In this case a carrier frequency and/or pulse frequency of the pulse width modulated signal is kept constant.

The phase position of the pulse within the period of the pulse width modulated signal may be determined randomly. As a result, on the basis of simulations suppression of the carrier signal at multiples of the carrier frequency is achieved in the order of magnitude of approximately 3 dB.

Carrier signal suppression of up to more than 25 dB can be achieved by dividing each period of the pulse modulated signal into M+1 time intervals, M being a maximum value of the quantized signal, and by processing the quantized signal in parallel through M loop filters, each loop filter being allocated to one time interval. The phase position of the pulse is then defined in such a manner that the pulse comprises that time interval whose allocated loop filter emits a largest output value of the loop filters, and a value dependent on the value of the pulse modulated signal in a particular time interval is fed back to a subtractor arranged in front of the loop filter allocated in each case. The loop filters with feedback thereby basically correspond to sigma-delta modulators. Since for each time interval a single one of these modulators simulates the quantized signal, in the case of such a method the carrier signal is suppressed by transverse extinction, which equates to the principle of a filter with finite impulse response (FIR filter). The phase position of the pulse may be defined in particular in such a manner that the pulse comprises as large as possible a number of time intervals with largest output values of the loop filters, and naturally account must be taken of producing a coherent pulse having a length corresponding to the value of the quantized signal. This principle of transverse extinction is also illustrated for example in U.S. Pat. No. 6,300,892 B2, the content of which is incorporated by reference herein.

The quantized signal may have a polarity. In this case account must be taken of the fact that, in the event of a change in the polarity from one period to the next, the phase position of the pulse in the next period is defined in such a manner that the pulse of the next period comprises the first time interval of the next period. The carrier frequency can thus be kept constant.

For the feed back loop filters being able to function in a stable manner even without the feedback, each loop filter may itself have an internal feedback path, which in turn can have a limiter. In particular a loop filter of this kind may have at least two integrators connected in series, a feedback path being provided for each integrator from an output of the particular integrator to a negative input of the particular subtractor arranged in front of the loop filter and a forward path being provided from the output of the particular integrator to an input of an adder at the output of the loop filter.

For the conversion of an input signal, for example a pulse code modulated signal, into a pulse width modified signal a device that implements the conversion of a quantized signal into a pulse width modified signal described above can be arranged behind a corresponding quantizer for converting the input signal into a quantized signal. To achieve the optimum signal-to-noise ratio this combination can be embedded in a control loop, in which a main subtractor and a main loop filter are arranged in front of the quantizer and the pulse width modulated signal generated is fed back to a negative input of the main subtractor. The main loop filter in this case essentially has the same transfer function as the loop filters, which are allocated to the different time intervals.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 5 illustrates examples of values for signals from FIG. 1.

FIG. 6 illustrates a possible loop filter from FIG. 1.

FIG. 7 illustrates a further possible loop filter from FIG. 1.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
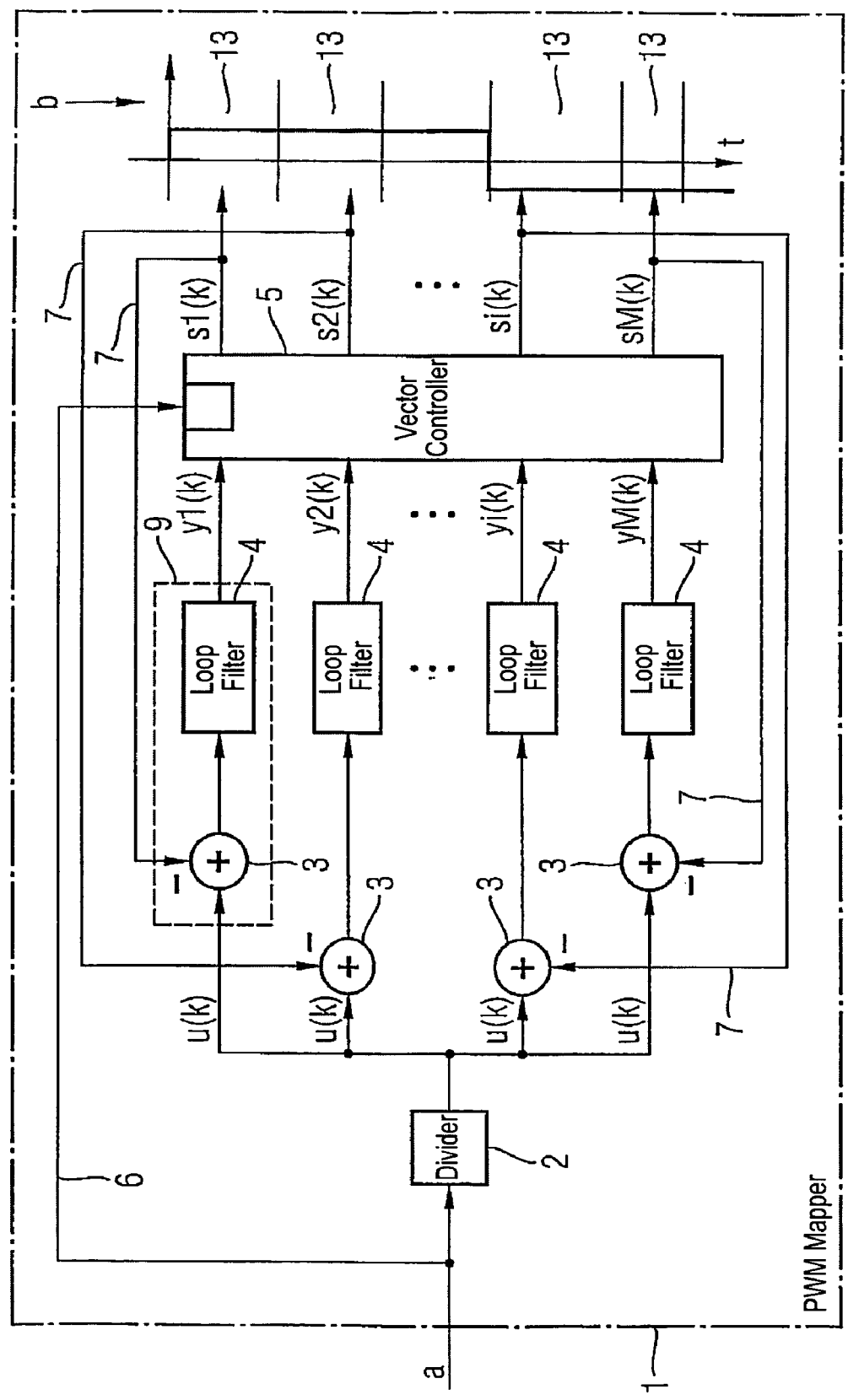
FIG. 1 illustrates an embodiment according to one embodiment of the invention for the conversion of a quantized signal into a pulse width modulated signal.

FIG. 1 illustrates one embodiment of a device according to the invention for the conversion of a quantized input signal a into a pulse width modulated signal, that is, a so-called PWM mapper 1. In this case it is assumed that the quantized signal a can assume values from 1 to M.

Figure 3:
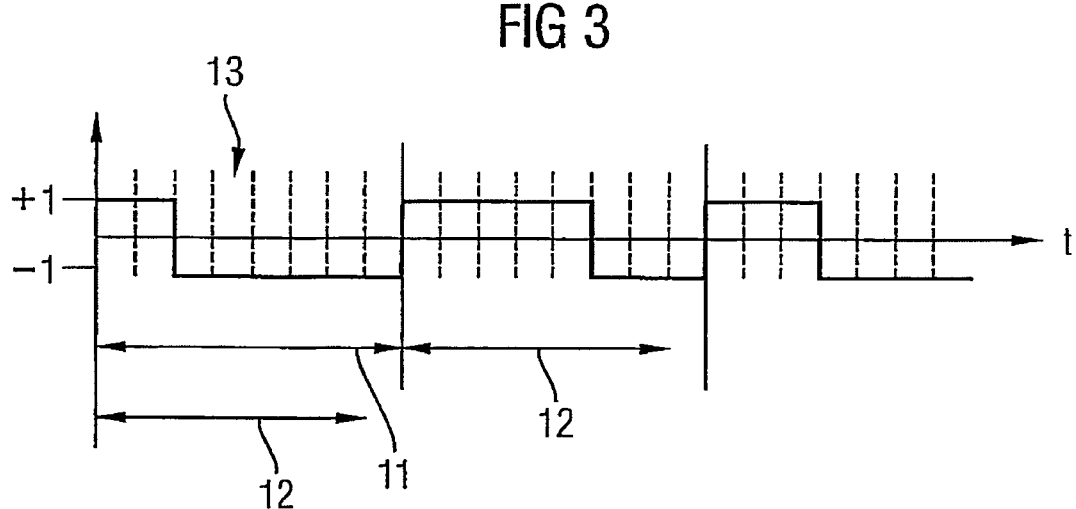
FIG. 3 is an explanation of dividing periods of the pulse width modulated signal into time intervals.

As illustrated in an explanatory way in FIG. 3, each period 11 of the pulse width modulated signal to be generated is divided into M+1, eight in the example illustrated, time intervals 13. The maximum duration of a pulse in such a period amounts to M time intervals, as indicated by arrows 12. In the first period illustrated the pulse comprises two time intervals 13, in the second period illustrated five time intervals 13 and in the third period illustrated three time intervals 13, which corresponds to values for the quantized signal a of two, five and three.

In the embodiment from FIG. 1, the quantized input signal a is divided by M through a divider 2 and fed to a positive input of M subtractors 3 as input signal u(k). The index k in this case should indicate that said feeding is repeated in a clock cycle corresponding to the quantized input signal a. In each subtractor 3 a signal si(k) i=1 to M is also fed back to a negative input via feedback lines 7 from a control unit and/or a vector controller 5, which function is described in detail below.

The difference between the input signal u(k) and the signal si(k) fed back in each case is fed to a particular loop filter 4, which generates an output signal yi(k), i=1 to M.

Figure 2:
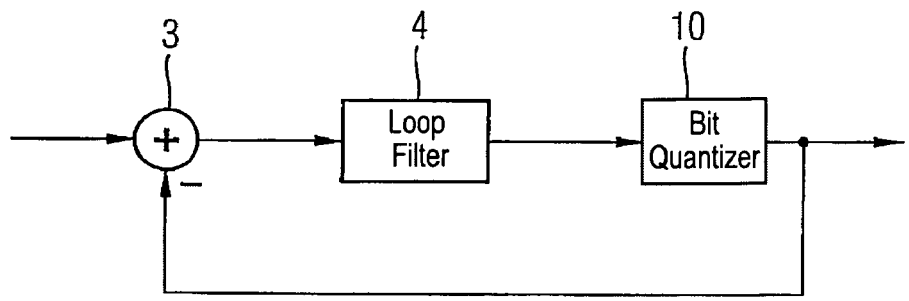
FIG. 2 is an illustration of a part 9 of the device from FIG. 1.

This combination 9 of subtractor 3 and loop filter 4 with the feedback line 7 essentially represents a normal digital sigma-delta modulator (SD modulator), as illustrated in FIG. 2. This contains, apart from the subtractor 3 and the loop filter 4, yet another quantizer, for example a 1 bit quantizer 10, whose function in the embodiment of FIG. 1 is essentially taken over by the vector controller 5. In the following the combination 9 is called an SD modulator for simplicity.

In the embodiment of FIG. 1, M digital SD modulators are thus connected in parallel. The input signal u(k) for these M digital SD modulators is proportional to the quantized input signal a, so that each individual digital SD modulator maps the input signal a onto a bit sequence.

The vector controller 5 from the output signals yi(k) of the loop filters 4 generates signals si(k) which can assume a value +1 or −1 and according to the SD modulators are allocated to a respective time interval 13 of the pulse width modulated signal b to be generated. Additionally, the quantized input signal a is fed directly to the vector controller 5 by means of a line 6.

The pulse width modulated signal is then generated in such a manner that the pulse within a period of the pulse width modulated signal comprises those time intervals in which the signal si(k) assumes the value +1.

The vector controller 5 is configured so that it generates the signals si(k) in such a manner that a coherent impulse results, the length of which depends on the value of the quantized input signal a. In contrast to a normal pulse width modulator, however, the pulse length is not only varied but the vector controller 5 also governs the phase position of the pulse within each period.

In one embodiment, it is necessary that the vector controller 5 generates the signals si(k) according to a specific algorithm. The following conditions have to be fulfilled in this case:

1. The stability of the M SD modulators must be ensured by corresponding feedback signals si(k).

2. The resulting pulse duration of the pulse width modulated signal b must correspond to the value of the quantized input signal a.
3. A carrier frequency of the pulse width modulated signal may not change, only phase jumps are permitted.

A constant carrier frequency (point 3) is important in this case because with a variable carrier frequency substantial interference arises in the baseband due to statically distorted pulse edges. Lack of asymmetry with the pulse edges then leads to substantial noise.

For stable operation of M SD modulators there is a basic rule according to which those SD modulators, whose output values yi(k) have the largest value, receive +1 as the feedback signal si(k), while the value −1 is allocated to the remaining si(k). This means that the vector controller 5 is configured so that it identifies the order of rank of the largest yi(k) values and according to the necessary pulse duration a defined by the quantized input signal determines those signals si(k) to which the value +1 is allocated.

Since a specific SD modulator is allocated to each time interval 13 within a period 11, the feedback must take place in such a way that an individual pulse results for each period from the allocation of the signals si(k). Taking into account the largest values of yi(k) the most advantageous phase of the pulse for the stability of the SD modulators can then be determined. The vector controller 5 therefore evaluates all possible pulse positions within a period on the basis of the yi(k).

A problem with large pulse lengths can be that according to this algorithm a pulse length becoming larger results in a reduced number of possible phase positions of the pulse, so that in the case of a pulse duration becoming larger and an increasing number of SD modulators, stabilizing feedback is no longer possible. A specific number of SD modulators would then constantly receive a value +1 as signal si(k) via the corresponding feedback line 7.

In order to resolve this problem the signals yi(k) and si(k) may be seen as being inverted for large required pulse durations. Thus with the same algorithm stable operation is enabled, since the previous pulse duration is now picked up as a pulse pause.

Despite the phase jumps that occur because the pulse in each period can assume a different phase position, the carrier frequency must remain absolutely constant for the reasons already mentioned. Therefore the vector controller 5 is memory-aided, that is to say, it remembers the phase position of preceding periods and ensures constant carrier frequency.

Figure 4:
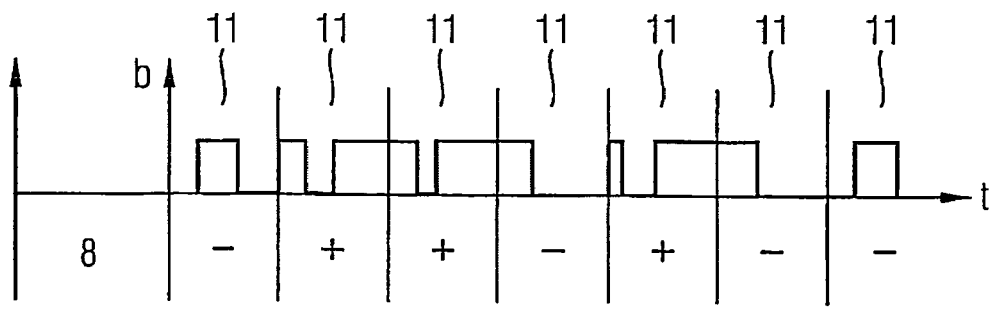
FIG. 4 illustrates a possible pulse width modulated signal where the polarity of the quantized signal is changing.

In FIG. 4 a possible phase-modulated signal b is shown over the time t. In this case the possible states are shown with constant carrier frequency for different phase transitions. In line 8 a polarity of the quantized input signal is illustrated, wherein minus means negative polarity and plus means positive polarity. In the event of a change in the polarity from one period to the next, a signal must be present at the beginning of the next period in order to keep the pulse frequency constant in each case. The interference to the feedback caused by these forced states described above is compensated by the SD modulators in conjunction with the vector controller.

The function of the vector controller 5 will now be clarified on the basis of FIG. 5. In the example M=7, that is, seven time intervals are provided. Column n designates the pulse length defined by the quantized input signal, column k a time step. Note that the values for the yi illustrated in the table have been selected for better illustration of the definition of the values for si and do not necessarily correspond to the actual values for yi.

As can be clearly recognized in the table of FIG. 5, an s value of +1 has been allocated at least to a largest y value in each line. Furthermore the +1 values in a number as defined by column n are distributed in such a way that a +1 is allocated to as many of the largest yi values as possible and as few of the smallest yi values as possible, whereby the +1 values must be coherent. In line 2 (k=2) there are two largest values, that is, y2 and y5, which both amount to 4. Since, however, one pulse duration is required for one time interval (n=1), a value +1 can only be allocated to one of the si, in this case s2.

Due to the control mechanisms of the vector controller 5 described basic principle-induced dead times can occur in the individual control loops of the SD modulators, so for stability reasons the loop filters 4 of the M SD modulators must be stable even without feedback.

As illustrated in FIG. 6, this can be achieved by a loop filter with corresponding internal feedback of a state vector vx(k) by means of an internal state vector feedback 15. A loop filter 4 from FIG. 1 is thus formed by the loop filter 14 and the internal state vector feedback 15. Alternatively a filter with finite impulse response can also be used as the loop filter.

In the case of loop filters of second or higher order, instability in the M SD modulators may arise when the device from FIG. 1 is driven at a high level. A typical loop filter, as illustrated in FIG. 7, comprises an integrator 16. In order to prevent instability, it is advantageous to provide a limiter 17 in an internal feedback path, which limiter prevents values of the feedback that are too large and thus the integrator 16 returns automatically to a stable state when again driven at a lower level.

Figure 8:
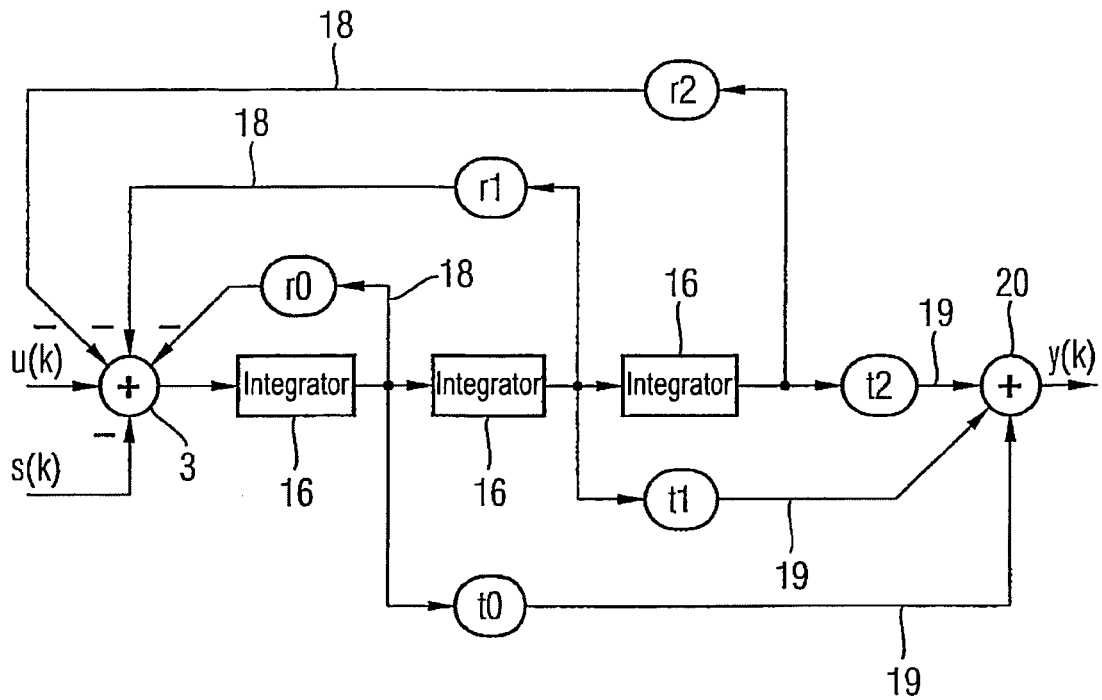
FIG. 8 illustrates a third possible loop filter from FIG. 1.

In FIG. 8 an alternative embodiment of a third order loop filter of this kind is illustrated. This comprises three integrators 16 arranged one behind the other, wherein from an output of each integrator a feedback takes place by means of a feedback line 18 to the subtractor 3 allocated in each case. These feedbacks are weighted with coefficients r0, r1, and r2. Additionally the output of each integrator 16 is connected to an adder 20 at the output of the loop filter via lines 19. These transverse lines are likewise weighted with coefficients, transverse coefficients t0, t1 and t2.

For stability reasons, this third order filter should have a finite impulse response, that is, all poles of the open control loop should lie within the unit circle.

Figure 9:
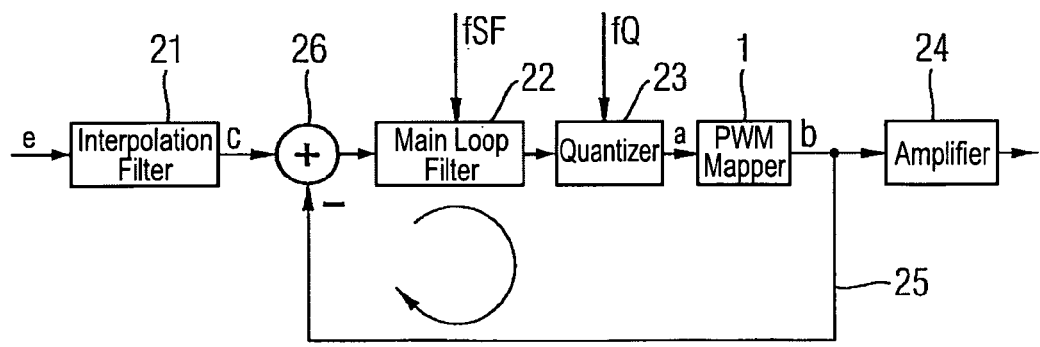
FIG. 9 illustrates the embedding of a device according to one embodiment of the invention in a control loop.
Figure 11:
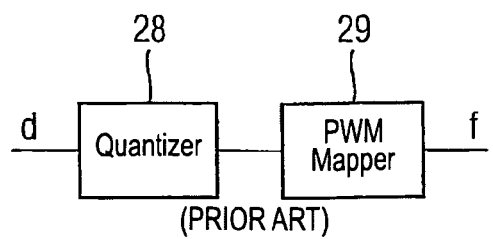
FIG. 11 illustrates a pulse width modulator in accordance with the prior art.

FIG. 9 illustrates a complete pulse width modulator, the device 1 from FIG. 1 being embedded in a control loop (indicated by the circular arrow) for improvement of the signal-to-noise ratio. In this case an input signal e, for example a pulse code modulated signal, is first (optionally) fed to an interpolation filter 21. An output signal c of the interpolation filter 21 forms an input signal for the control loop and is fed to a positive input of a subtractor 26. The control loop consists of a main loop filter 22, a quantizer 23 and a PWM mapper 1, which substantially corresponds to the PWM mapper 1 from FIG. 1. The output signal of the PWM mapper 1 is fed back to a negative input of the subtractor 26. In addition the output signal is fed to an amplifier 24.

Due to the phase jumps of the pulse width modulated signal b generated this new type of pulse width modulation may be called "digital jumping PWM" (DJ-PWM) and the corresponding amplifier may be called a Class DJ amplifier.

The loop filter 22 and the quantizer 23 in this case are operated at different clock frequencies fSF and fQ, since the PWM mapper 1 converts the different amplitude values of the quantized signal a into different pulse widths. The configuration of such loop filters and the embedding of a PWM mapper in a control loop are described in detail in US 2004/0165661 A1, the content of which is incorporated by reference herein.

Figure 10:
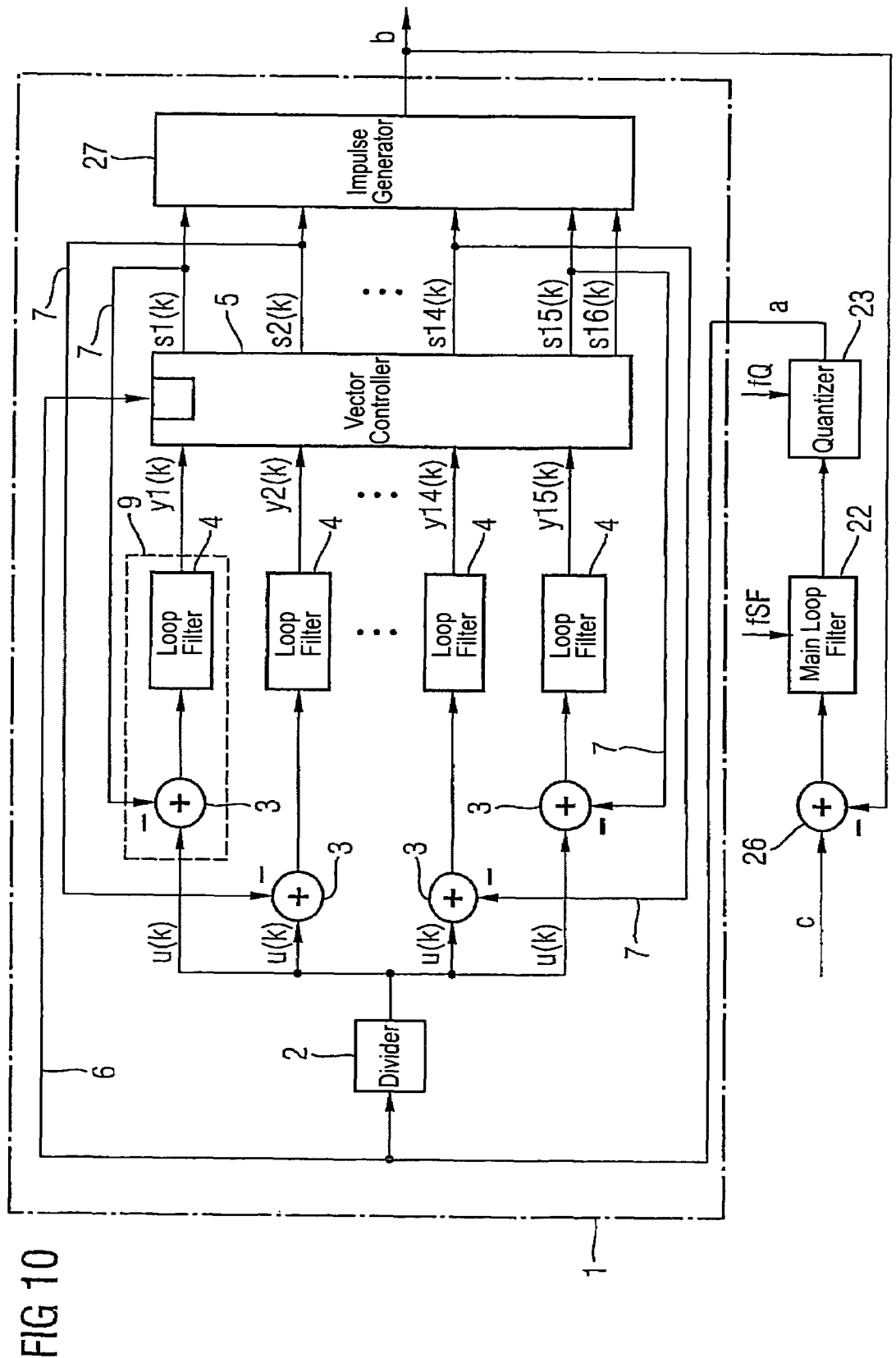
FIG. 10 illustrates an embodiment of embedding a device according to the invention in a control loop.

Finally, FIG. 10 illustrates the pulse width modulator from FIG. 9 in more detail, although the interpolation filter 21 and the amplifier 24 have been omitted. This illustration substantially corresponds to a combination of FIGS. 1 and 9, so that only a few additional details are dealt with here.

The quantizer 23 in this case is a 4 bit quantizer, that is to say the quantized input signal a can assume values from 1 to 15. Accordingly, 15 parallel SD modulators 9 are provided. The divider 2 thus divides the signal a by 15. The vector controller 5 has 16 output signals si(k). This is due to the fact that, as already described with reference to FIG. 3, the period for a maximum pulse length of 15 amounts to 16. The signals si(k) are fed to an impulse generator 27, which produces the individual pulse of the pulse width modulated output signal b according to the settings of the signals si(k).

The present invention is of course not limited to the embodiments illustrated. In principle other methods of phase determination of the individual pulses are also conceivable. In addition the number of SD modulators can of course be adapted to the required bit width.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for converting a quantized signal into a pulse width modulated signal having a frequency spectrum, the method comprising:
   determining a pulse duration of a pulse within a period of the pulse width modulated signal, wherein the determination is dependent on a signal value of the quantized signal and wherein the pulse width modulated signal assumes a first value during the pulse duration of the period and assumes a second value during a remaining duration of the period; and
   varying a phase position of the pulse within the period of the pulse modulated signal from period to period such that an energy of the pulse width modulated signal is distributed across the frequency spectrum of the pulse width modulated signal.

2. The method of claim 1, further including randomly determining the phase position of the pulse within the period of the pulse width modulated signal.

3. The method of claim 1, further including dividing each period of the pulse width modulated signal into M+1 time intervals, M being a maximum value of the quantized signal, the quantized signal being processed in parallel by M loop filters, each loop filter being allocated to one of the time intervals, the phase position of the pulse being defined in such a way that the pulse comprises that of the time intervals whose allocated loop filter emits a largest output value of the loop filters, and wherein a value dependent on the value of the pulse width modulated signal in a particular time interval is fed back to a subtractor arranged in front of the loop filter allocated to said particular time interval.

4. The method of claim 3, further including determining the phase position of the pulse in such a way that the pulse comprises as large as possible a number of time intervals with largest output values of the loop filters.

5. The method of claim 3, wherein the dependent value is +1 or −1, +1 corresponding to the first value of the pulse width modulated signal and −1 the second value of the pulse width modulated signal.

6. The method of claim 3, wherein the quantized signal has a polarity, and wherein in the event of a change in the polarity from one period to the next period, the phase position of the pulse in the next period is defined in such a manner that the pulse of the next period comprises the first time interval of the next period.

7. The method of claim 3, wherein each of the loop filters processes the quantized signal divided by the factor M.

8. The method of claim 3, wherein each of the loop filters implements a feedback of an internal state vector.

9. The method of claim 1, wherein a pulse frequency of the pulse width modulated signal is kept constant.

10. A device for converting a quantized signal into a pulse width modulated signal, comprising:
    control means for determining a specific pulse duration of a pulse within a period of the pulse width modulated signal, wherein the determination is dependent on a value of the quantized signal, and wherein the pulse width modulated signal assumes a first value during the pulse duration of the period and assumes a second value during a remaining duration of the period;
    wherein the control means is configured such that it varies a phase position of the pulse within the period of the pulse modulated signal from period to period such that an energy of the pulse width modulated signal is distributed across the frequency spectrum of the pulse width modulated signal.

11. The device of claim 10, wherein the control means is configured such that it randomly determines the phase position of the pulse within the period.

12. The device of claim 10, wherein each period of the pulse width modulated signal is divided into M+1 time intervals, M being a maximum value of the quantized signal, wherein the control means further comprise a controller, M parallel connected loop filters, and M respective substractors, wherein each respective subtractor is arranged upstream of a corresponding loop filter and a signal derived from the quantized signal is fed to a positive input of the respective subtractor, wherein in each case an output of each loop filter is connected to an input of the controller, wherein the control means are configured so that they determine the phase position of the pulse in such a manner that the pulse comprises that one of the time intervals whose allocated loop filter emits a largest output value of the loop filters, and wherein M feedback paths are provided for feeding back a value, corresponding to the value of the pulse width modulated signal in a time interval allocated to the loop filter, to a negative input of the respective subtractor.

13. The device of claim 12, wherein the device further comprises divider including an input to receive the quantized signal and an output connected to the positive input of each of the subtractors, wherein the divider is configured o divide the quantized signal received at its input by a dividing factor equal to M and provide the divided signal at its output.

14. The device of claim 12, wherein each of the loop filters has an internal feedback path.

15. The device of claim 14, wherein the feedback path has a limiter.

16. The device of claim 14, wherein each of the loop filters has at least two integrators connected in series, wherein a feedback path is provided for each integrator from an output of the particular integrator to a negative input of the particular subtractor arranged in front of the corresponding loop filter and a forward path from the output of the particular integrator to an input of an adder at the output of the corresponding loop filter.

17. The device of claim 12, wherein each of the loop filters has a finite impulse response.

18. The device of claim 12, wherein the phase position of the pulse is determined in such a way by the control means that the pulse comprises as large as possible a number of time intervals with largest output values of the loop filters.

19. The device of claim 12, wherein the value fed back to said negative input of said respective subtractor is +1 or −1, +1 corresponding to the first value of the pulse width modulated signal and −1 to the second value of the pulse width modulated signal.

20. The device of claim 12, wherein the quantized signal has a polarity, and wherein in the event of a change in the polarity from one period to the next period, the phase position of the pulse in the next period is defined in such a manner by the control means that the pulse of the next period comprises the first time interval of the next period.

21. The device of claim 10, wherein a pulse frequency of the pulse width modulated signal is kept constant.

22. An arrangement for converting an input signal into a pulse width modulated signal comprising:
   a quantizer configured to receive the input signal and produce a quantized signal;
   a device for converting the quantized signal into a pulse width modulated signal, the device having control means for determining a specific pulse duration of a pulse within a period of the pulse width modulated signal, wherein the determination is dependent on a value of the quantized signal, and wherein the pulse width modulated signal assumes a first value during the pulse duration of the period and assumes a second value during a remaining duration of the period;
   wherein the control means is configured such that it varies a phase position of the pulse within the period of the pulse modulated signal from period to period such that an energy of the pulse width modulated signal is distributed across the frequency spectrum of the pulse width modulated signal.

23. The arrangement of claim 22, wherein the input signal is a pulse code modulated signal.

24. The arrangement of claim 22, wherein the arrangement further comprises a main subtractor as well as a main loop filter arranged between the main subtractor and the quantizer, wherein the input signal is fed to a positive input of the main subtractor, and the arrangement comprises a feedback path for feeding back the pulse width modulated signal to a negative input of the main subtractor.

25. The arrangement of claim 24, wherein said device is configured such that each period of the pulse width modulated signal is divided into M+1 time intervals, M being a maximum value of the quantized signal, wherein the control means comprise a controller, M parallel connected loop filters, and M respective substractors, wherein each respective subtractor is arranged upstream of a corresponding loop filter and a signal derived from the quantized signal is fed to a positive input of the respective subtractor, wherein in each case an output of each loop filter is connected to an input of the controller, wherein the control means are configured so that they determine the phase position of the pulse in such a manner that the pulse comprises the time intervals whose allocated loop filter emits a largest output value of the loop filters, and wherein M feedback paths are provided for feeding back a value, corresponding to the value of the pulse width modulated signal in a time interval allocated to the loop filter, to a negative input of the respective subtractor, and wherein the main loop filter essentially has the same transfer function as the loop filters.

26. The arrangement of claim 24, wherein the main loop filter and the quantizer are configured for operation at different clock rates.

* * * * *